April 22, 1952     A. H. LAIDIG     2,593,771
APPARATUS FOR THE MANUFACTURE OF GLASS ARTICLES
Filed April 17, 1946     5 Sheets-Sheet 1

INVENTOR
A. H. LAIDIG
BY
ATTORNEY

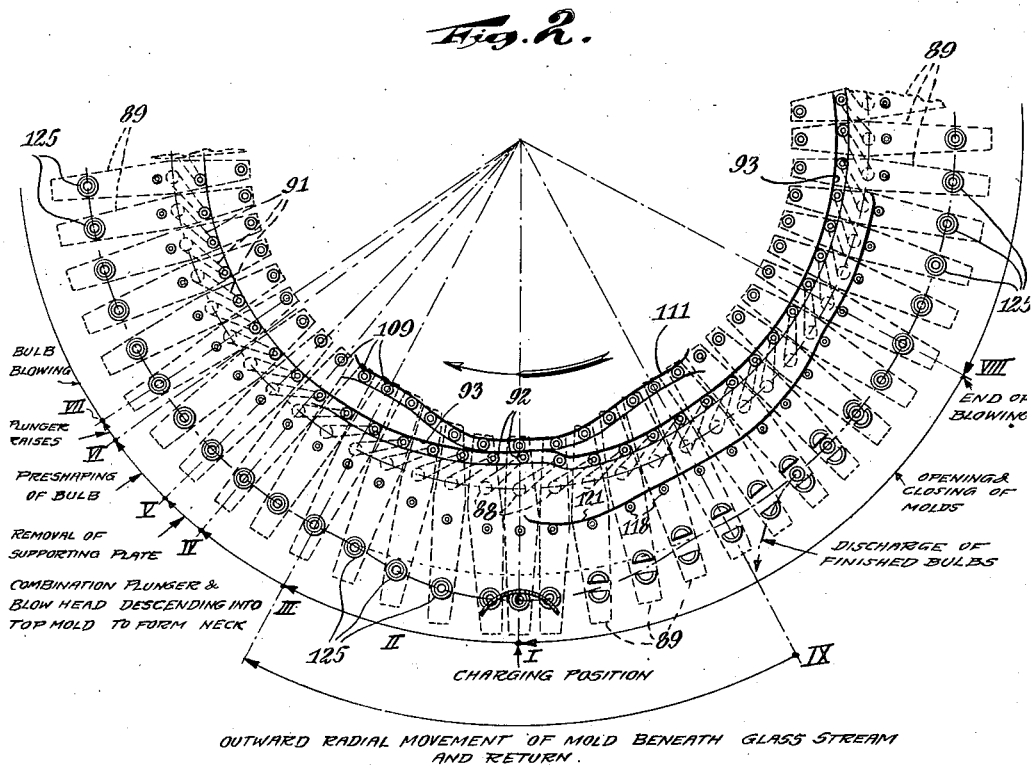
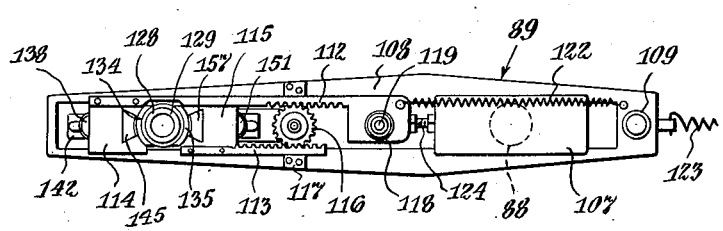
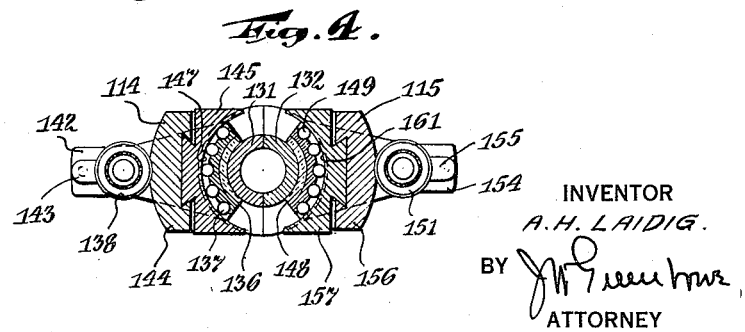

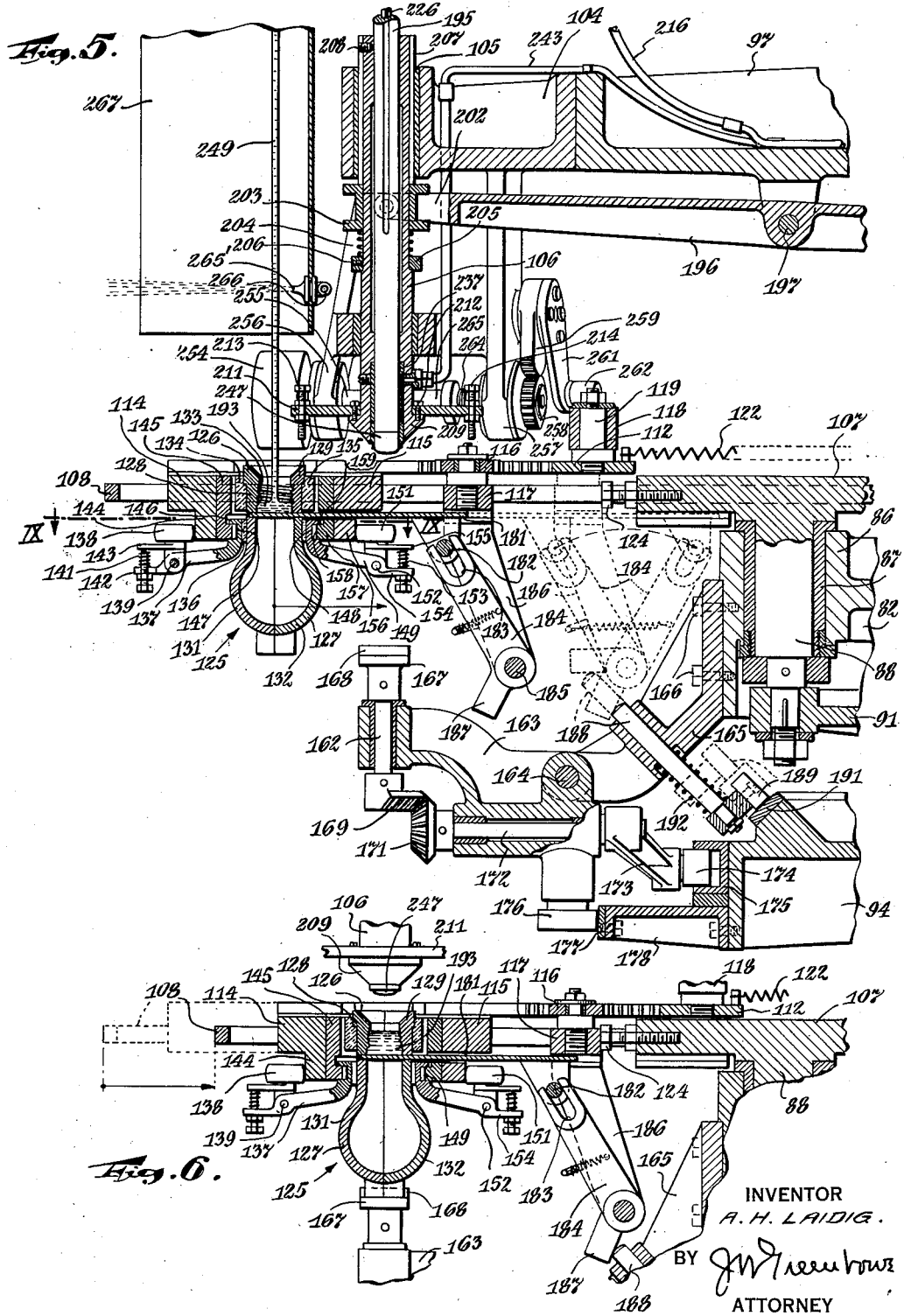

April 22, 1952     A. H. LAIDIG     2,593,771
APPARATUS FOR THE MANUFACTURE OF GLASS ARTICLES
Filed April 17, 1946     5 Sheets-Sheet 4
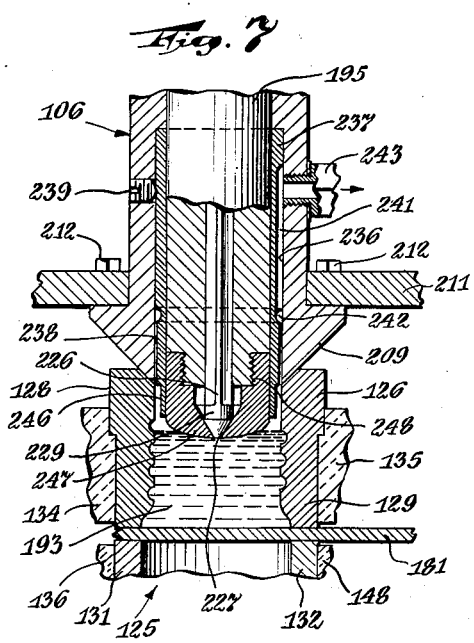
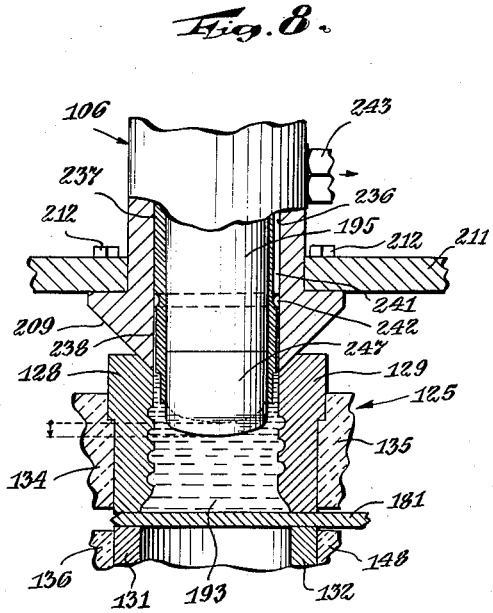
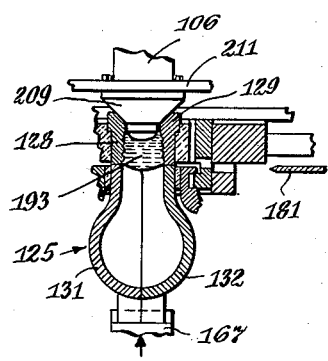
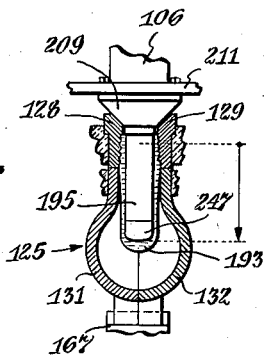
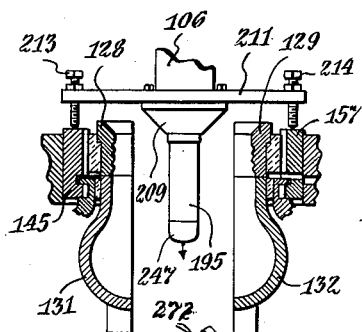
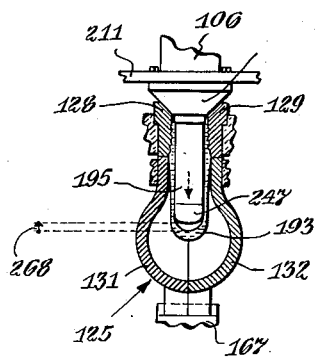
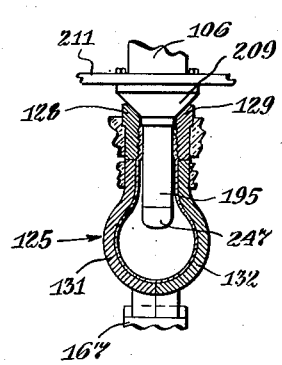
INVENTOR
A. H. LAIDIG.
BY
ATTORNEY

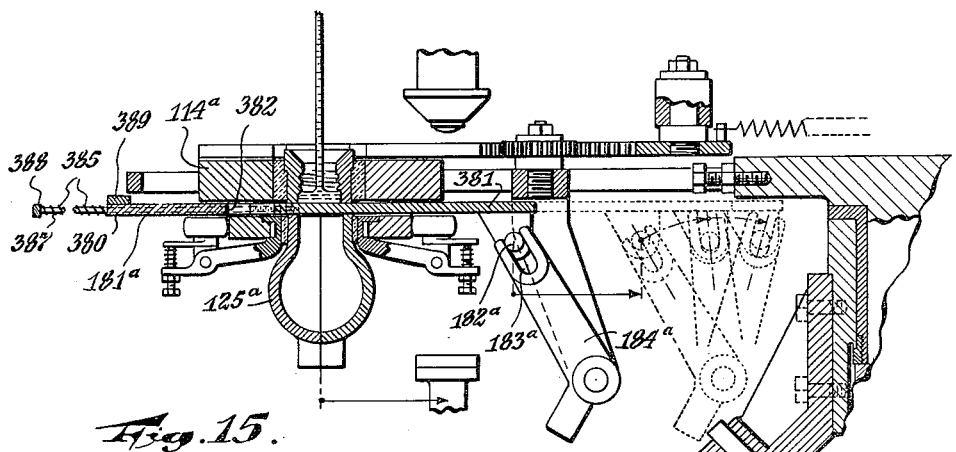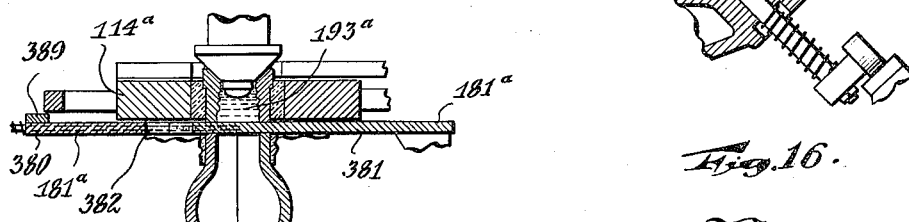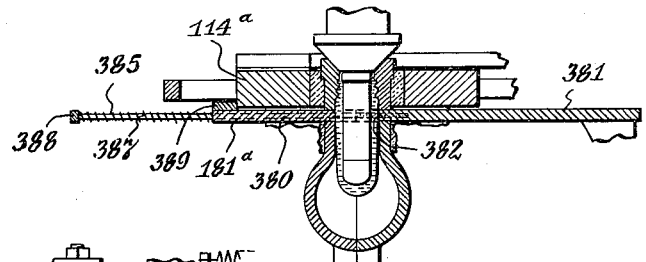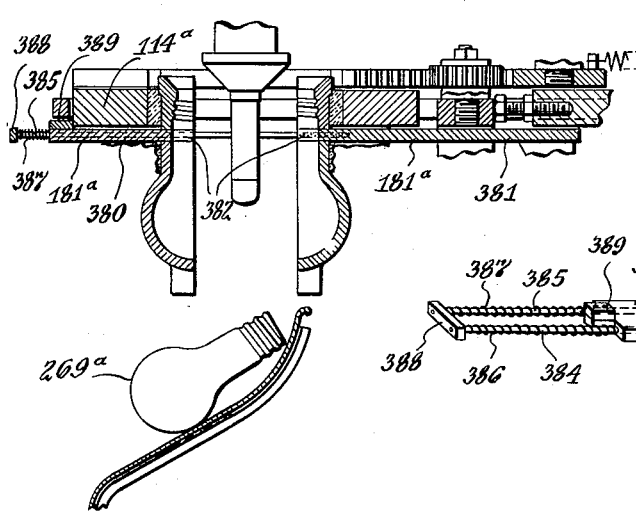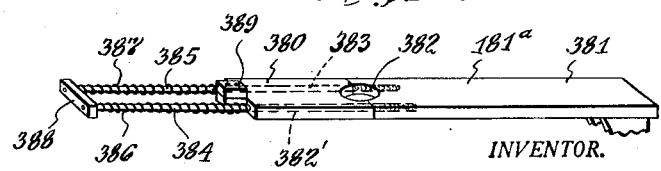

Patented Apr. 22, 1952

2,593,771

UNITED STATES PATENT OFFICE 2,593,771

APPARATUS FOR THE MANUFACTURE OF GLASS ARTICLES

Alfred H. Laidig, Bloomfield, N. J., assignor to Westinghouse Electric Corporation, East Pittsburgh, Pa., a corporation of Pennsylvania Application April 17, 1946, Serial No. 662,724

6 Claims. (Cl. 49—8)

This application is a continuation-in-part of my application, Serial No. 491,479, filed June 19, 1943, and now abandoned.

This invention relates to the manufacture of glass articles, and particularly bulbs for incandescent electric lamps, by means of apparatus involving an improvement over that of the Richardson et al. Patent No. 2,393,265, dated January 22, 1946.

The principal object of my invention, generally considered, is the manufacture without cullet or moil, of glass articles by the provision of an apparatus for that purpose.

Another object of my invention is to improve on the apparatus for manufacturing glass articles by filling the top portion of a mold with freely-flowing molten glass, pressing a portion of said glass between the top portion of said mold and a plunger insertable thereinto, releasing the remainder of said glass for movement into the lower portion of said mold, depressing said plunger to push said glass into said mold lower portion, and then introducing air through said plunger to blow said released glass into final form in said mold lower portion.

A further object of my invention is to provide apparatus for manufacturing glass articles comprising a mold formed as top and bottom portions, means laterally movable between said portions to either separate them or provide free access therebetween to form in effect a single mold, a plunger depressible, first, into the upper portion of said mold to press the upper portion of the glass article to be formed and, then, after release of the remainder of said glass into the lower portion of said mold, further depressible to push said glass remainder into said mold lower portion and then introduce air thereinto for blowing said glass to final form in said mold.

Other objects and advantages of the invention, relating to the particular arrangement and construction of the various parts, will become apparent as the description proceeds.

Referring to the drawings illustrating my invention:

Fig. 2 is a fragmentary diagrammatic plan of the mold holding portions of the apparatus, showing part of the path that the molds travel during the operation of the machine.

Fig. 3 is an enlarged plan of one of the mold carriers or carrying devices.

Fig. 4 is a horizontal sectional view on the line IX—IX of Fig. 5, showing details of the mold holding portion of the carrier.

Fig. 5 is an enlarged fragmentary view corresponding to the left hand portion of Fig. 1 but on a larger scale and with more parts in axial section, showing the relative positions of the parts during the time a mold is being filled with glass from a furnace, and is in the location designated by the reference character I in Fig. 7.

Fig. 6 is a fragmentary view corresponding to Fig. 5 but showing the relative positions of the parts when the mold has reached the location designated by the reference character III in Fig. 2.

Fig. 7 is a view on a larger scale, corresponding to Fig. 6, but showing the relative positions of the parts while the mold is traveling between the positions designated by the reference characters III and IV in Fig. 2, the plunger being partly depressed into the mass of glass.

Figure 1:
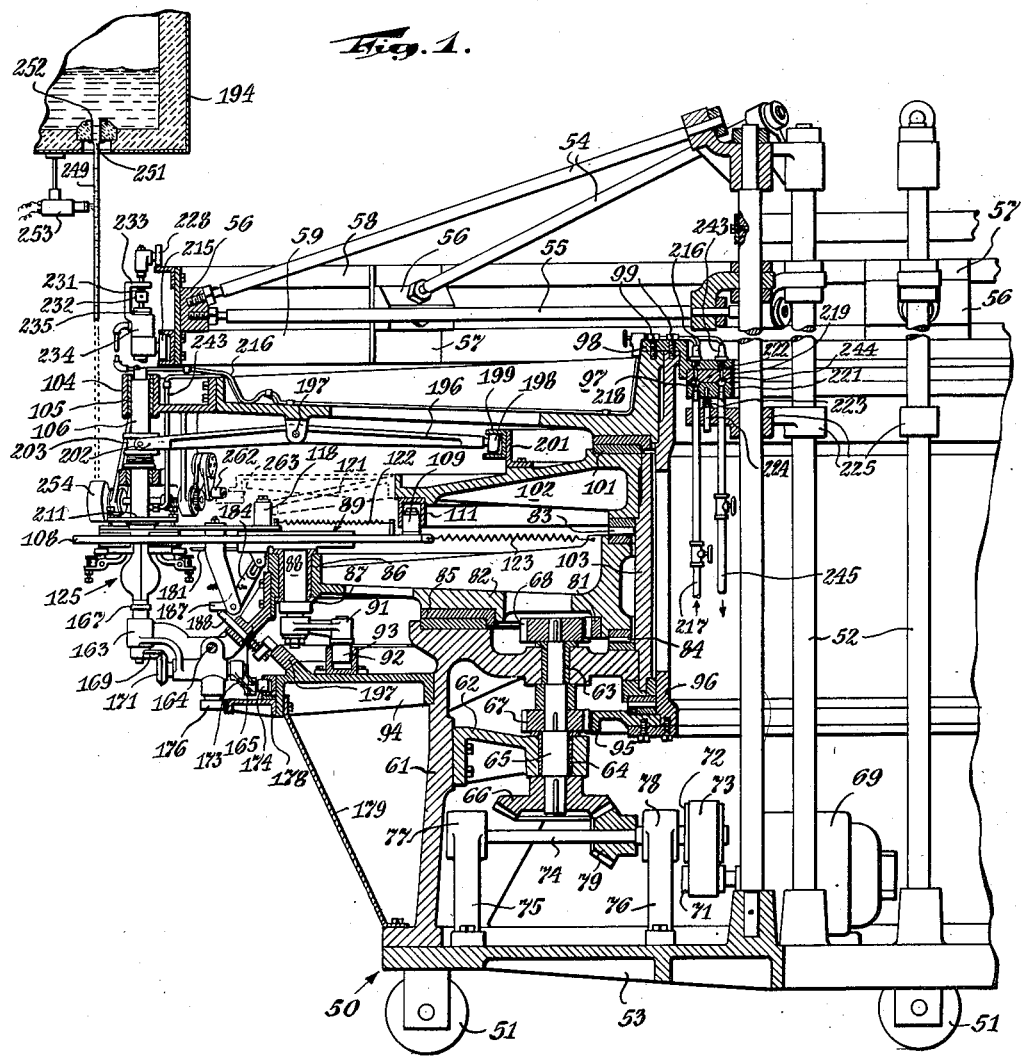
Fig. 1 is a vertical sectional view of a machine for molding glass articles, together with a fragmentary portion of an associated glass furnace.

Fig. 8 is a view corresponding to Fig. 7, but showing the relative positions of the parts when the mold has reached the position designated by the reference character IV in Fig. 2, the plunger having been moved further into the mass of glass to press a portion thereof between it and the upper portion of the mold, aided by suction to withdraw air from above the mass of glass and insure that it is pressed into all the interstices between the associated parts.

Fig. 9 is a view corresponding to Fig. 6, but showing the relative positions of the parts when the mold has reached the location designated by the reference character V in Fig. 2, the supporting plate having been withdrawn to release the glass, not pressed into the upper portion of said mold around the plunger, for travel into the lower portion of the mold, which lower portion has moved upwardly to engage the upper portion and form in effect a complete unitary mold.

Fig. 10 is a view corresponding to Fig. 9, but showing the relative positions of the parts when the mold has reached the location designated by the reference character VI in Fig. 2, the plunger having at this point moved downwardly into the sagging glass to preform the lower or main portion of the bulb, while the pressed or upper portion is held in place because of its having cooled sufficiently, also assisted by the suction applied to the upper edge thereof.

Fig. 11 is a view corresponding to Fig. 10, but showing the relative positions of the parts when the mold has reached the location designated by the reference character VII in Fig. 2, the plunger having been slightly withdrawn for the admission of compressed air to blow the glass in the mold.

Fig. 12 is a view corresponding to Fig. 11, but showing the relative positions of the parts when the mold has reached the location designated by the reference character VIII in Fig. 2, the glass article being then expanded to the fullest extent by compressed air.

Fig. 13 is a view corresponding to Fig. 12, but showing the relative positions of the parts when the mold has reached the location designated by the reference character IX in Fig. 7, the mold being then opened and the glass article or bulb discharged therefrom.

Fig. 14 is a fragmentary view corresponding to Fig. 5, but showing a modification.

Fig. 15 is a fragmentary view of the modification of Fig. 14, but showing the parts in the position corresponding with Fig. 8.

Fig. 16 is a fragmentary view of a succeeding position of the same modification, corresponding with the phase of the first embodiment illustrated in Fig. 10.

Fig. 17 is a view of a subsequent position of the parts of the same modification, corresponding with the phase of the first embodiment illustrated in Fig. 13.

Fig. 18 is a perspective view of the modified form of sliding plate used in said modification.

*Apparatus of Figs. 1 to 13, inclusive*

Referring to the drawings in detail, like parts being designated by like reference characters, and first considering the apparatus embodying my invention and illustrated in Figs. 1 and 7 to 18, inclusive, there is shown a frame 50 which may be mounted on rollers 51, in order to be conveniently moved. The frame carries a number of vertical standards or posts 52 extending from the base plate 53 thereof and from the upper portions of which extend braces, those designated 54 extending downwardly and outwardly, and those designated 55 extending horizontally and radially, with their ends connected by blocks 56, attached to bracing plates 57 of the circular frame, formed of cam elements 58 and 59 which will be referred to later.

The frame 50 also carries a generally cylindrical or slightly frusto-conical casting 61, which in turn carries bearing casting 62, respectively provided with bearings 63 and 64 in which is mounted a shaft 65. The shaft 65 has a bevel gear 66 at its lower end, a spur gear 67 intermediate its ends, and a spur gear 68 at its upper end, all of said gears being keyed to the shaft, and said spur gears serving to drive rotatable parts of the machine, as will be subsequently described.

The shaft 65 is driven from a source of power, such as an electric motor 69, mounted on the base 53 of the frame 50, through pulleys 71 and 72 and connecting belt 73, said pulley 72 being mounted on a jack shaft 74 supported by brackets 75 and 76, also mounted on the base plate 53, and carrying bearings 77 and 78. The shaft 74 carries a bevel gear 79 keyed thereto and meshing with the gear 66 for driving the shaft 65.

The spur gear 68 meshes with teeth 81 on a mold carrier spider 82 for driving the same about the vertical axis of the frame 50. This spider 82 preferably comprises an annular casting rotatable on bearings 83, 84 and 85, and provided adjacent its circumference with apertures 86 carrying bushings or bearing members 87 in which are rotatably mounted stub shafts 88 extending downwardly from the mold carriers 89. A crank arm 91 is secured to the lower end of each shaft 88 and carries a roller 92 traveling in a cam track 93, carried by a shelf casting 94 for causing the mold carriers to angle as they revolve about the axis of the spider 82, as illustrated in Fig. 2.

The spur gear 67 engages teeth of an annular gear 95 mounted on the lower portion of a hollow cylindrical driving member 96 for the plunger-carrying plate 97, to the inner peripheral portion of which it is fastened, as by means of connecting and bearing-carrying casting 98 and screws 99. The plate 97 is rotatably mounted on a bearing 101, supported on an annular plate 102, which latter is mounted on a generally cylindrical member 103 extending from the casting 61. The peripheral portion of the plate 97 carries a series of castings 104, each provided with bearings 105 for one of the plunger sleeves or housings 106.

Each mold carrier 89, the series of which is shown in outline in Fig. 2, is in accordance with the detailed showing of Fig. 3, and comprises a block 107 mounted on the top of a corresponding stud shaft 88, and on which its mold carrier frame 108 is slidable. Each frame 108 carries a cam roller 109 normally guided in the groove of a cam 111 which is carried by the annular plate member 102, as most clearly shown in Fig. 1. Slidably mounted on each mold carrier frame 108 are rack bars 112 and 113, the former connected to the outer mold carrier device 114, and the latter connected to the inner mold carrier device 115. An idler gear 116, pivoted on a cross member 117 of each frame 108 between said rack bars 112 and 113, serves to operatively tie said bars together for movement in opposite directions, when the rack bar 112 is moved by engagement of its roller 118, which is mounted on a vertical pivot 119 extending therefrom, with mold-opening and closing cam 121, as shown most clearly in Figs. 1 and 2. A coil spring 122 connects each rack member with its frame for holding the roller 118 against its cam 121, thereby keeping the mold members closed, except when positively actuated by said cam. A coil spring 123, connecting each frame 108 with the spider 82, keeps the frames in retracted positions, with their cross members 117 engaging adjustable stop devices 124 extending from the blocks 107, except when positively actuated by the cam 111.

Each mold 125, as shown most clearly in Figs. 3, 4, 5 and 6, comprises a top or upper portion 126 and a bottom or lower portion 127, all formed of metal such as iron. Each top portion 126 is in turn divided on an axial plane into an outer portion 128, and an inner portion 129, and each lower or bottom portion 127 is likewise divided on an axial plane into an outer portion 131 and an inner portion 132. When used for the manufacture of lamp bulbs, the mold portions are desirably cork lined or coated on the inside with a paste made of cork and shellac, about 1/64 of an inch thick. The upper mold portions may be formed with threads 133, if they are to make lamp bulbs with screw-threaded bases or necks.

The upper outer portion 128 of each mold 125 is held in its outer mold carrier device 114 by a preferably heat-insulating bushing section 134, while the upper inner portion 129 of each mold 125 is held in its inner mold carrier device 115 by a preferably heat-insulating bushing section 135, as shown in Figs. 3 and 5.

Provision is made for oscillating the lower portion of each mold and for this purpose each lower outer section 131 is held by a preferably heat-insulating bushing section 136 mounted on a roller bearing device 137, pivoted to a ball bearing device 138, as indicated at 139. A spring 141 serves to engage arms 142 and 143 on each of the devices 137 and 138, in order that each depending annular collar section 144, of the outer mold carrier devices 114, and the sliding element 145, dovetailed with respect thereto, as illustrated in Fig. 4, may be gripped between the corresponding roller and ball bearing devices 137 and 138, with an inwardly extending shoulder portion of 145 disposed between the sides 146 of the roller bearing raceway 147 of the corresponding device 137, in order to hold the associated mold portion 131 at the desired elevation.

In the same way, each lower inner section 132 is held by a preferably heat-insulating bushing section 148, mounted on a roller bearing device 149, pivoted to a ball bearing device 151, as indicated at 152. A spring 153 serves to engage arms 154 and 155 on the devices 149 and 151, in order that the depending annular collar section 156 and associated sliding element 157, dovetailed with respect thereto, as illustrated in Fig. 4, may be gripped between the roller and ball bearing devices 149 and 151, with the inwardly extending shoulder portion 158 disposed between the sides 159 of the roller bearing raceway 161 of the device 149, in order to hold the associated mold portion 132 at the desired elevation, corresponding with that of the mold portion 131.

The means for oscillating the lower portions 127 of the molds during the molding operation comprises shafts 162 which normally extend vertically, are rockably mounted in carrier devices 163, pivoted at 164 to an actuator carrying member 165 secured to the peripheral portion of the mold-carrier spider 82, as by means of bolts 166. Each shaft 162 carries at its upper end a head 167, from which extends a flange or lug 168 adapted to fit between flanges corresponding with those designated 107 and 108 as illustrated in Fig. 7 of said Patent No. 2,393,265, previously referred to, and depending from the corresponding lower mold sections 131 and 132, as indicated in Figs. 1 and 6, for the purpose of imparting oscillatory motion thereto, without preventing movement of said sections toward and away from one another. Each head 167 is so positioned that when the corresponding mold carrier is drawn inwardly by means of the cam 111, as from the position illustrated in Fig. 5, to that of Fig. 6, said depending mold flanges straddle the upstanding flange 168, thereby interlocking the head 167 with the mold sections 131 and 132 for transmitting the desired oscillatory motion to the latter.

For imparting oscillatory motion to each head 167, I provide bevel gear segments 169, secured to the lower ends of the shafts 162, and meshing with bevel gears 171, secured to normally horizontal shafts 172, rotatably mounted in carrier devices 163, and each carrying at its inner end a crank arm 173, provided with a roller 174 traveling in a cam track 175, which is serpentine in side elevation in order to provide the desired oscillatory motion to said crank, which motion is in turn transmitted to the corresponding head 167.

Each carrier 163 is also provided with a roller 176 engaging a cam 177 carried by a casting 178, secured to the shelf casting 94, and rigidified with respect to the casting 61 by diagonally extending braces 179. The cam 177 is of such formation that it causes each carrier device 163 to rise, when it reaches the desired phase of its motion, about its pivot 164 and raise the engaged lower mold portions 127 into contact with the corresponding upper mold portions 126, or from the position shown in Fig. 8 to that of Fig. 9.

The upper mold portion 126 of each mold 125 is initially separated from the lower mold portion 127 by a horizontally sliding plate 181 provided with a lug 182 secured to its lower surface, and with a portion received in a notch 183 in the upper end of a lever 184, pivoted at 185 to a bracket 186 depending from the corresponding mold carrier 108. The lower end of each lever 184 carries an operating lug 187 engageable and moved by push rod 188, square or non-circular in section to prevent turning thereof, which reciprocates in the member 165 and carries at its lower end a roller 189 normally held in engagement with operating cam 191 by means of a coil return spring 192, so that when its mold carrier 108 is moved inward from the position illustrated in Fig. 5, to that illustrated in Fig. 6, the pivot 185 of the lever 184 is moved a corresponding distance. The plate 181 is withdrawn from the position between the upper and lower portions of its mold 125, as illustrated in Fig. 9, allowing the lower portions 131 and 132 to be moved into engagement with the corresponding upper portions 128 and 129 when action of the cam 191 causes the push rod 188 to move from full line to dotted position illustrated in Fig. 5, and turn the lever 184 clockwise to its extreme right hand position.

In order to provide for blowing the mass of glass 193 in each mold, after reception thereof from an associated glass furnace 194, I provide a plunger 195 for each mold. Each plunger is slidably movable in a corresponding plunger housing or sleeve 106, which is independently operable by a lever 196 pivoted to the carrying plate 97 or 197, and carrying a roller 198 at its inner end, movable in a cam track 199 carried by an angle iron 201, in turn mounted on the annular plate 102. The outer end of each lever 196 is forked as indicated at 202, and embraces a sleeve 203 slidable on the plunger housing 106, for resiliently acting thereon through a coil spring 204, disposed between said sleeve and an annular member 205, connected to the plunger housing 106 as by means of a set screw 206. Each sleeve 203 normally abuts against a bushing 207, secured on the plunger housing 106 in any desired manner, as by set screw means 208. The housing 106 is shown held in elevated position in Fig. 5, by the lever 196, through engagement between the sleeve 203 and bushing 207.

The lower portion of each housing 106 is beveled, forming a blow-head indicated at 209, to fit the correspondingly flared upper end portion of the corresponding mold 125, when it is lowered thereto, as shown most clearly in Fig. 7, thereby providing for accurately centering said housing and the associated plunger 195 with respect to its mold.

The lower portion of each housing 106 carries means for pushing down the corresponding sliding elements 145 and 157, to separate the mold sections as shown in Figs. 5, 6, 7 and 8, so that the sliding plate 181, shown in Fig. 5, may be inserted to provide a glass-receiving pocket in the upper portion 126 of the mold 125. For this purpose, a plate 211 is secured to each plunger housing 106, as by tap bolts 212, and at its outer ends provided with bolts 213 and 214 adjustably mounted therein and with their lower ends spaced the proper distance to cooperate with said sliding elements 145 and 157, as shown in Fig. 13, and on further downward movement push them back to lowered position for the purpose previously mentioned.

Each plunger 195 carries a roller 215 mounted near its upper end and traveling in the track formed by the channel-shaped cam member 59, which is braced by the members 57, 58, 53, 54 and 55, previously mentioned, whereby said plunger is moved up and down with respect to its mold 125, as desired.

In order to blow glass articles in the molds 125, compressed air is introduced to the plungers 195 by pipes 216, which connect with an air supply line 217 through ports 218 in a block 219, sliding on a block 221 formed with a registering port or groove 222. The block 221 is resiliently pressed against the rotating block 219, carried by connecting member 98, by springs 223 surrounding studs 224, fixed to the block 221 and slidable in supporting brackets 225 secured to posts 52, as shown in Fig. 1.

Compressed air passes to the lower portion or tip of each plunger 195 along a fluted or ribbed valve stem 226, shown in detail in Fig. 7, and out of the valve opening 227 when the stem 226 is raised with respect to the plunger 195, as by means of cam 58 acting on roller 228 carried by the upper end of said valve stem. Each valve 229 is kept closed, as shown in Fig. 7, by a coil spring 231 acting between a collar 232 secured to the upper portion of the stem and a stop 233 extending from the head 234 which receives compressed air from pipe 216, and is closed by a nut and associated packing 235.

The blow head 209 is desirably formed with a cavity or enlargement 236 to receive a sleeve 237, the upper portion of which snugly fits the enlargement, while the lower portion is spaced therefrom, as indicated at 238, to allow for passage of air therebetween. The sleeve 237 is desirably secured in place as by means of a set screw 239 and has a longitudinal groove 241 communicating with a circumferential groove 242. The groove 242 defines the upper edge of the air passage space 238.

A pipe or tube 243 connects with the blow head 209 adjacent the upper end of the groove 241, the other end of said pipe 243 connecting with the block 219, sliding on block 221 formed with a registering port or groove 244. As previously described, the block 221 is resiliently pressed against the block 219. In addition to the air supply line 217, the block 221 also carries a vacuum line 245 so that air may thereby be withdrawn from the annular space 238 of the blow head along through connecting pipe 243.

This vacuum connection is to assist the plunger 195 in causing glass to be molded between the outer peripheral surface of the plunger tip and sleeve 237 and the upper portion of the mold part 126. The purpose of having a separate sleeve 237, instead of having the plunger and blow head formed to provide the desired passage therebetween, is so that changes may be conveniently and economically made when it is desired to blow articles of different configurations. The sleeve 237, in the present embodiment, has a reduced annular lower section 246 between which and the mold part 126 molten glass may be molded to provide the desired edge of the bulb or other article being formed. When a different article is made, the sleeve member 237 may be replaced by another of correspondingly changed configuration. For similar reasons the tip 247 of the plunger 195 is desirably formed separate and secured to the lower end of the main plunger portion by cooperating threads 248 on the parts, as shown most clearly in Fig. 12.

By virtue of making the tip 247 and the sleeve 237 separate from the associated parts they, if desired, may be made of Nichrome or more refractory material (than that of the main mold, plunger and blow-head portions which may be of steel), or even of such expensive metal as platinum-rhodium, because of their relatively small size, thereby making a construction which is very durable. It is particularly desirable that the sleeve 237 be formed of very durable material, in view of its relatively thin construction, if used in the manufacture of bulbs of the character illustrated, for which the apparatus now discussed is particularly designed.

Molten glass is desirably supplied to the molds, one by one, by means of a stream 249 flowing freely from the glass melting furnace 194 through an orifice 251 provided by a die 252, which die is preferably formed of an alloy of platinum and rhodium, such as described and claimed in the Richardson Patent No. 2,190,296, dated February 13, 1940.

The temperature of said stream is desirably maintained uniform by sighting a radiation pyrometer 253 thereon and controlling the heat of the furnace by means of apparatus such as described and claimed in the Richardson Patent No. 2,116,450, dated May 3, 1938, so that an accurately controlled amount of glass is fed to each mold as it passes under the stream 249 issuing from said furnace.

In order to cut off the glass when the desired amount has been placed in a mold, without leaving a string, and transfer the stream 249 to the adjacent mold without waste, I may employ rollers 254, one associated with each plunger 195, so that at the proper time the corresponding roller will cut the glass stream, thereby terminating the filling of one mold, and transfer said stream to the adjacent mold.

Such an operation is illustrated diagrammatically in Figs. 17 to 20, inclusive, of Patent No. 2,393,265, previously referred to, Figs. 17 and 20 representing the position of the roller and the associated mold, when the roller is just starting to sever the glass stream, Fig. 18 representing the subsequent position where the glass stream has been severed and carried over by the roller preparatory to letting it drop into adjacent mold in position "B," and Fig. 19 representing the final position where the glass stream has been actually shifted from the mold in position "A" to that in position "B."

The means for shifting each roller 254 so that it cuts off the glass stream at the desired point and transfers it from one mold to the next, is illustrated in Figs. 1 and 5 of the present application and in Figs. 1, 6, 15 and 16 of said Patent No. 2,393,265. Each roller 254 is mounted on a shaft 255, desirably carried by ball bearings in arms 256 and 257 extending downward from one of the castings 104. On the inner end of each shaft 255 is mounted a spur gear 258, meshing with a spur gear segment 259, desirably carried by roller bearings on a stub shaft extending from the casting 104. Secured to said gear segment 259 is a crank arm 261 carrying a roller 262, which is intermittently actuated by engagement with a cam 263 mounted on the frame of the machine, as the rollers 254 are carried around with the molds during operation.

The engagement of the cam 263 with a roller 262 occurs when it is desired to twirl that roller, so that its peripheral speed is greater than the speed of the glass stream, at the time the actual cut off of the glass occurs. After cutting off, the roller passes off the cam 263 and is restored to its initial position by its spring 264 acting between a bushing 265 secured thereto and the associated arm 257.

*Operation of embodiment of Figs. 1 to 13 incl.*

From the foregoing description of the elements of the machine, it will be seen that I have provided for the filling of a series of molds in order, the cutting of the stream of glass to one mold and the transferring of said stream to the next, the pressing of the glass by the plunger in the upper mold portion, the removal of the separator element from between the upper and lower portions of the mold, the bringing of the lower portion of said mold to the upper portion, the further downward movement of the plunger into a mass of glass, to partially shape it, the blowing of the glass article or bulb by compressed air, and the opening of the mold and discharge of the article.

The detailed operation involves first, the loading of a mold upper portion 126 from the stream 249 of glass at a temperature of say about 1200° C., as specified in Patent No. 2,116,450, previously referred to, where the glass is very fluid, with a viscosity of about 1000 poises, when the parts are positioned as shown in Fig. 5. See article by H. K. Richardson, entitled "Flow of Glass Through Tubular Orifices" beginning on p. 239, vol. 17, No. 8, "Journal of The American Ceramic Society," Aug. 1934. Although associated roller 254 serves for cutting off the glass stream during normal operation, yet if for any reason it is desired to remove the glass stream while the machine is stopped, without shutting off the glass melting furnace, said stream may be blown away by the jet or stream of compressed air issuing from a nozzle or tip 265' supplied by pipe 266 supported on shield 267.

When the desired amount of glass 193 has been applied to the mold above the sliding plate 181, as shown in Fig. 5, rotation of the mold carrying spider 82 carries the particular mold under consideration from the position designated as I in Fig. 2 through that designated as II, the mold being drawn inwardly on account of the formation of the cam 111, and at the same time said mold is moved angularly by the roller 92 travelling in its cam track 93, as shown in Figs. 1 and 2.

This angular movement, superimposed on the rotary or circumferential movement of the mold carrier 108, is what causes the mold 125 to move at a faster rate than the corresponding roller 254, after the glass stream 249 has been cut therefrom, as indicated in Figs. 17 to 20, inclusive, of said Patent No. 2,393,265. In other words, the angular movement of the mold carrier, induced by the cam track 93, first causes a speeding-up and then a slowing down of the resultant movement of the mold 125, as it approaches the filling position I, so that it is overrun by the associated glass switch roller 254, and the glass stream 249 is cut off and transferred to the following mold.

After this the mold moves faster, as the angular movement is then augmenting its circumferential speed, as shown by the increase in angular distance between the mold carriers on the radius II in Fig. 2 and the adjacent molds, as compared with that on the radius I and its adjacent molds. Therefore, each mold hesitates or momentarily stops as it reaches the position I in Fig. 2, where the glass stream pours into the upper part 126 of said mold, above the plate 181, until it is cut off and transferred to the succeeding mold, after which the first mold speeds up, and is traveling at practically normal circumferential speed by the time it reaches the position II in Fig. 2, although in this position it is still moving inward along a radius.

During its inward radial movement, from the position I to position II, the sliding plate 181 moves with the mold so that it is not at this time withdrawn from between the upper mold sections 126 and the lower mold sections 127.

From the time of the deposit of the glass in the upper portion 126 of the mold, until the plate 181 is withdrawn, the temperature drops from one where the glass is very fluid, or of watery consistency, to one where it is sufficiently viscous for working, that is, to about 1000° C., where the viscosity is about 10,000 poises, reference being had to the article by H. K. Richardson in the "Journal of the American Ceramic Society" previously referred to, and assuming the employment of glass customarily used for blowing bulbs for incandescent electric lamps, corresponding substantially with glass B of Fig. 9 of said article.

This working temperature is, of course, above that of the lower limit of the working range where the viscosity is about 1,000,000 poises, reference being had to page 159, vol. XIV, No. 56, Dec. 1930, and page 279, vol. XV, No. 60, Dec. 1931, both of the "Journal of the Society of Glass Technology." Such a viscosity has been found to correspond with about 800° C. when using the kind of glass previously referred to: see Fig. 3 of the article by Howard R. Lillie of Corning Glass Works, entitled "Viscosity Measurements in Glass" presented at the annual meeting, American Ceramic Society, Chicago, Ill., Feb. 1929, and found on page 523, vol. 12, Journal of the American Ceramic Society, May-Sept. 1929.

A further inward movement of the mold carrier 108, as it revolves from position II to position III, carries the mold 125 so that it underlies its plunger 195, blow-head 209, and overlies and interlockingly engages with the oscillating head 167, as shown most clearly in Fig. 6. The engagement with the oscillating head makes provision for rocking or oscillating the lower portions of the associated mold, by means of the corresponding arm 173 and roller 174 which travels in cam track 175, to prevent formation of seams during the subsequent blowing operation.

As the mold revolves further, it reaches the position designated by IV in Fig. 2 and shown in detail in Fig. 7. In this position, the plunger casing, blow-head, and plunger, which were alined with the mold in the position of Fig. 6, have now been lowered so that the bevelled and or blow-head portion 209 of said casing fits in the bevelled upper end portions of the upper mold sections 128 and 129, thereby insuring accurate centering and preventing leakage while making the bulb, and, at the same time, the plunger 195 is depressed to partially form the mass of glass 193 by compressing and causing it to rise, in the annular space between the mold upper portion 126, and the sleeve 237 and the plunger tip 247, so that upon further downward movement of the plunger to the position shown in Fig. 8, assisted by suction from the vacuum connection through pipe 243, said glass rises to completely fill said space as there illustrated when the mold reaches the position designated by the reference character IV in Fig. 2.

As the mold moves further it reaches the position designated V in Fig. 2, as shown in detail in Fig. 9. In this position, the cam 191 has moved roller 189 from full to dotted-line position, causes swinging of the lever 184 to the extreme right hand dotted position and a consequent withdrawal of the supporting plate 181 from beneath the glass. The interval prior to this release has afforded sufficient time for said glass to cool from freely-flowing molten to working condition, so that instead of running out of the mold like water, it merely sags into the lower portion slowly. The oscillating head 167, being still engaged with the lower portion of the mold, under the influence of the cam 177 on the roller 176, raises the lower mold sections 131 and 132 into engagement with the upper mold sections 128 and 129, thereby completing the mold for subsequent blowing of the glass therein.

As the mold moves further to the position designated VI in Fig. 2, the plunger 195 is further depressed as illustrated in detail in Fig. 10, partially shaping the glass by pushing it downwardly into the lower portion of the mold, after which it immediately starts to withdraw.

When the mold reaches the position designated as VII in Fig. 2, the plunger has been withdrawn a distance designated by the arrow 268 and the valve 229 opened, allowing compressed air to start expansion of the mass of glass 193, as shown in Fig. 11. This blowing operation continues from position VII to position VIII, and at the end of the period the glass article is fully distended in the mold, as shown in Fig. 12. During the blowing period, the plunger stays in the position represented in Figs. 11 and 12, the lower portion of the mold being oscillated by the rocking movement of the head, due to the action of the cam 175 on the roller 174, thereby preventing the formation of seams and avoiding any possibility that the glass article will stick to said mold.

When the mold reaches the position IX, as shown in Fig. 2, the cam 121 has operated on the roller 118 and caused the mold portions 128 and 131 to be separated from those designated 129 and 132, as shown in detail in Fig. 13, while at the same time the plunger casing 106 moves downwardly. Movement of said casing down beyond that position illustrated in Fig. 13, depresses the sliding elements 145 and 157 to lower the mold portions 131 and 132, and provide a space between them and the upper mold sections 128 and 129 to allow for a return of the sliding plate 181. The opening of the mold allows the glass article 269 to drop therefrom and slide from the machine as along a suitable chute 271 from which it is discharged. The head 167, at this point, has been dropped by the action of cam 177, to provide the necessary clearance for the chute 271.

Further movement of the mold brings it while open to suitable means, such as a water spray, not shown, for cooling and wetting (Fig. 2), and it then moves outwardly to position I, where its sections have been moved together by the action of the cam 121, and the sliding plate 181 returned to the position shown in Fig. 5, providing, with the upper mold sections 128 and 129, a pocket for receiving another mass of glass 193 to be blown into a bulb or other article, in accordance with the shape of the mold.

The product

The mold used with the apparatus, heretofore described, is especially designed for blowing glass bulbs 269, as illustrated in Fig. 13. Such bulbs differ from those of conventional lamps in that the end portion of each neck is provided with screw threads 272, corresponding with the threads on a conventional medium-screw base for an incandescent electric lamp.

General remarks

In view of the foregoing disclosure, it will be seen that I have provided an improved apparatus in connection with molding glass articles. By means of my invention, it is possible to accurately manufacture such articles because of the provision for measuring the amount of glass that is introduced into the mold. It is possible to accurately measure the glass introduced into the mold, because the flowing of glass in the stream 249 is controlled by means of a radiation pyrometer, and the length of the stream which forms the mass of glass 193 to be blown into the finished article, is accurately cut off by means of the corresponding switch roller 254, or other cut-off means such as disclosed in said Patent No. 2,393,265.

Not only is the amount of glass blown exactly determined by the apparatus of the invention, but this may be done without waste, except in the embodiment of Figs. 26 to 30, inclusive, of said Patent No. 2,393,265 as, instead of blowing away or otherwise wasting the glass between filling times, said glass may be carried by the corresponding roller 254 and deposited in the next mold, the operation being so quick that the glass does not have time to solidify on the roller nor is there time for any substantial amount of glass to accumulate thereon before it is transferred to the next mold.

On account of the manner in which the glass articles are formed, it is possible to operate the machine at a high speed, a machine such as shown being operable with the mold spider 82 running from 6 to 8 revolutions per minute, thus making it possible to manufacture 512 articles per minute.

Although I have shown my apparatus particularly adapted for the manufacture of bulbs suitable for incandescent electric lamps, it is obvious that I do not wish to be limited to this showing, as merely changing the form of the molds makes it possible to manufacture other kinds of glass articles. It will also be understood that I am not limited to the use of any special kind of glass although, of course, the kind of glass will determine the temperature at which the glass furnace is operated.

To briefly summarize or enumerate the steps of one embodiment of the method of blowing glass articles which I have disclosed, it is stated that said method involves the following:

1. Charge the top portion of a mold above a supporting separator with a measured quantity of glass so hot that it flows freely.
2. Bring blow-head, plunger, and associated sleeve into registry with top of mold.
3. Press a portion of said glass into the annular space between plunger, sleeve and mold top portion by downward movement of plunger while applying suction to the top of the glass and allowing it to cool to working consistency.
4. Remove the separator.
5. Bring the mold bottom to join the top.
6. Further depress said plunger portion into the mass of glass as it sags toward the bottom portion of the mold.

7. Withdraw the plunger slightly and at the same time introduce compressed air therethrough to blow the glass in the mold.

8. Oscillate the mold bottom during the blowing operation, in order to prevent sticking and the formation of seams.

9. Laterally separate the halves of the upper and lower mold portions to allow the finished glass article to drop therefrom.

10. Lower the mold bottom to allow for reintroduction of separator.

11. Moisten the mold in preparation for the next molding operation.

12. Slide separator between upper and lower mold portions to make ready for next charge.

Although preferred embodiments of my invention have been disclosed, it will be understood that other modifications may be made within the spirit and scope of the appended claims, and that the machine is capable of close adjustment by changing one or more of the following factors: (1) the size of the die 252; (2) the temperature and composition of the glass; and (3) the speed of rotation of the machine, so that the volume of glass deposited in each mold corresponds with the cubic content of the glass forming the article being molded, without appreciable excess or deficiency.

Although I have disclosed use of an imperforate sliding plate 181 for separating the lower mold sections from the upper mold sections, which sections are relatively movable with respect to one another, it will be understood that I contemplate the use of a mold 125ª that has upper and lower sections immovable with respect to one another and a separator 181ª which slides in a slot in said mold and which has an aperture corresponding with the mold neck aperture. When said separator aperture registers with said mold neck it, in effect, unites the upper and lower portions of said mold into a complete mold, and allows molten glass 193ª, if in the mold upper portion, to sag through said aperture.

The modification of my invention described in the preceding paragraph is illustrated in Figs. 14 to 18, inclusive. The operation of this apparatus is identical with that of the preceding embodiment, except that upper and lower elements of the mold 125ª are not brought together after the withdrawal of a plate from between upper and lower sections thereof, as the upper and lower portions thereof are vertically immovable with respect to one another, and the sliding plate 181ª is always disposed between said sections. When its aperture 382 is aligned with the mold neck, as illustrated in Fig. 16, it completes said mold or bridges the gap between the upper and lower sections thereof, forming in effect portions of said mold.

However, because of the necessary separation of the mold laterally to discharge the blown glass article as illustrated in Fig. 17, the sliding plate 181ª is formed in two parts, that is, an inner part 381 carrying the lug 182ª received in notch 183ª in the upper end of operating lever 184ª, which parts of course, correspond with the correspondingly numbered parts without the exponent a, as described in connection with the preceding embodiment, and an outer part 380. The latter has longitudinal apertures 382' and 383 which respectively slidably receive rods 384 and 385, fixed to and projecting longitudinally from the end of the part 381. Externally of the part 380 are respectively mounted coil springs 386 and 387 on said rods 384 and 385, said springs being held compressed against the outer end of said sliding plate section 380 by suitable means such as a cross member 388 fixed to the ends of said rods, so that said sliding plate normally tends to stay in engagement with the inner plate portion 381, as illustrated in Figs. 14, 15, 16 and 18.

When the aperture 382 registers with the mold neck aperture, as viewed in Fig. 16, the lug portion 389 on the end of the sliding plate portion 380 engages the outer mold carrier device 114ª, corresponding with the part 114 of the first embodiment. Upon opening the mold to release the glass article 269ª, as viewed in Fig. 17, the outer sliding plate portion 380 is pulled away from the inner portion 381, as viewed in Fig. 17, thereby not interfering with the release of the glass article 269ª.

In using such a separator glass is poured into the upper portion of the mold when the separator is disposed with an imperforate portion in supporting relationship to initially hold said glass in the mold upper portion. When said glass has cooled to working consistency, as from 1,000 poises to 10,000 poises, the separator plate instead of being entirely withdrawn is merely moved so that its aperture registers with the mold upper portion and releases the glass, allowing it to sag into the mold lower portion. This avoids the necessity for moving the mold portions together, even after release of the glass, as the portions of the separator defining the release aperture therethrough bridge the space between the mold upper and lower portions. Otherwise the apparatus and its operation may be identical with that of the first embodiment.

I claim:

1. Apparatus for forming glass articles comprising a rotatable spider, a series of mold carriers supported by said spider and rotatably and radially movable with respect thereto, a mold secured to each carrier and divided horizontally and vertically into upper and lower side sections, cam means for moving each carrier and opening and closing the side sections of each mold, a rotatable plate carrying for each mold a combined plunger housing, with blow-head having a sleeve projecting therebelow, and an associated plunger, means for supplying air under pressure to each plunger, each sleeve closely fitting its plunger, but with its lower end space of such a size that when it is moved into its mold an annular space of desired radial dimension is provided between it and the upper sections of said mold cam means for moving each plunger and housing independently of one another, axially toward and away from their mold, a connection for withdrawing air from between each blow-head and sleeve, while the associated plunger is being operated, to cause glass to be molded in the annular space between said sleeve and the upper section of its mold, an air valve in each plunger, cam means for opening and closing each valve to at the proper time supply air to a mass of glass in its mold, means carried by said housing for depressing the lower sections of its mold, means slidable between each pair of upper and lower mold sections to support a mass of glass in the upper sections, and means for moving said slidable means to allow said glass to sag into the lower sections of said mold prior to introduction of the plunger thereinto and the blowing of the glass article.

2. Apparatus for forming glass articles comprising a rotatable mold-carrying spider, a series of mold carriers supported by said spider and rotatably and radially movable with respect thereto, a mold secured to each carrier and divided horizontally and vertically into upper and lower side sections, separator means which may be disposed between the upper and lower sections of each mold for initially supporting a charge of glass therein, means for moving said separator, after charging said upper sections, in order to allow the glass to sag into said lower sections, a rotatable plate carrying for each mold a combined plunger housing, with blow-head having a sleeve projecting therebelow, and an associated plunger, each sleeve closely fitting its plunger, but with its lower end of such a size that when it is moved into its mold an annular space of desired radial dimension is provided between it and the upper sections of said mold, means for moving each combined housing into engagement with the upper sections of its mold and forcing its plunger into a charge of glass in its mold to partially form the desired article, a connection for withdrawing air from between each blow-head and sleeve, while the associated plunger is being operated, to cause glass of said charge to be molded in the annular space between said sleeve and the upper section of its mold, means for introducing compressed air from said plunger to distend the mass of glass in its mold, and means for laterally separating the side sections of said mold to allow the glass article to drop therefrom.

3. Apparatus for forming glass articles comprising a series of mold carriers revolvable about, and radially movable with respect to, an axis and a mold secured to each carrier and divided horizontally into upper and lower sections, each of which sections is divided into side sections, means for moving each carrier and opening and closing the side sections of said mold, rotatable means carrying for each mold a combined plunger housing, with blow-head having a sleeve projecting therebelow and an associated plunger, each sleeve closely fitting its plunger, but with its lower end of such a size that when it is moved into its mold an annular space of desired radial dimension is provided between it and the upper sections of said mold, means for supplying air under pressure to and moving each plunger and housing independently of one another axially toward and away from their molds, a connection for withdrawing air from between each blow-head and sleeve, while the associated plunger is being operated, to cause glass to be molded in the annular space between said sleeve and the upper section of its mold, an air valve in each plunger, means for opening and closing each valve to at the proper time supply air to a mass of glass in the associated mold, means carried by each housing for depressing the lower sections of its mold, means slidable between each pair of upper and lower sections to support a mass of glass in said upper sections, and means for moving each slidable means to allow said glass to sag into the lower sections of said mold, prior to introduction of the associated plunger thereinto and the blowing of a glass article by air passing through said plunger.

4. Apparatus for forming glass articles, comprising a mold, a combined plunger housing, with blow-head having a sleeve projecting therebelow, and an associated plunger, said sleeve closely fitting its plunger but with its lower end of such a size that when it is moved into said mold an annular space of desired radial dimension is provided between it and the mold, means for moving said plunger and housing independently of one another axially toward and away from said mold, and a connection for withdrawing air from between said blow-head and sleeve, while the plunger is being operated, to cause glass to be molded in the annular space between said sleeve and the mold.

5. Apparatus for forming glass articles comprising a mold consisting of upper and lower sections, a separator plate for said sections, means for moving said separator plate to and from supporting position between said sections, a combined plunger housing with blow-head having a sleeve projecting therebelow, and an associated plunger, said sleeve closely fitting its plunger, but with its lower end of such a size that when it is moved into the mold, after the introduction of molten glass into said upper section, an annular space of desired radial dimension is provided between it and the upper section of said mold, said plunger being movable through the upper and into the lower section of said mold to act on such glass after the separator plate has been moved to release position and the glass has sagged toward said lower section, a connection for withdrawing air from between the blow-head and sleeve, while the plunger is being operated, to cause glass to be molded in the annular space between said sleeve and the upper section of said mold, and means for introducing air into the glass acted on by said plunger to distend it in said mold.

6. Apparatus for forming glass articles comprising a rotatable mold-carrying spider, a series of mold carriers supported by said spider and rotatably and radially movable with respect thereto, a mold secured to each carrier and divided horizontally and vertically into upper and lower side sections, a separator slidable in a slot disposed between the upper and lower sections of each mold for initially supporting a charge of glass therein, said separator being formed as two parts movable away from each other and resiliently urged together, the engaging portions of said parts being notched to together form an aperture corresponding with the interior of the mold at the slot, means for moving said separator after charging said upper sections in order to allow the glass to sag into said lower sections, a rotatable plate carrying for each mold a combined plunger housing, with blow-head having a sleeve projecting therebelow, and an associated plunger, each sleeve closely fitting its plunger, but with its lower end of such a size that when it is moved into its mold an annular space of desired radial dimension is provided between it and the upper sections of said mold, means for moving each combined housing into engagement with the upper section of its mold and forcing its plunger into a charge of glass in its mold to partially form the desired article, a connection for withdrawing air from between each blow-head and sleeve, while the associated plunger is being operated, to cause glass of said charge to be molded in the annular space between said sleeve and the upper section of its mold, means for introducing compressed air from said plunger to distend the mass of glass in its mold, and means for simultaneously laterally separating the side sections of said mold and the parts of said separator to allow the glass article to drop from the mold.

ALFRED H. LAIDIG.

(References on following page)

REFERENCES CITED

The following references are of record in the file of this patent:

UNITED STATES PATENTS

| Number | Name | Date |
|---|---|---|
| 529,665 | Neville | Nov. 20, 1894 |
| 688,924 | Blair et al. | Dec. 17, 1901 |
| 774,708 | Swan | Nov. 8, 1904 |
| 1,736,767 | Burrows | Nov. 19, 1929 |
| 1,896,870 | Smith | Feb. 7, 1933 |
| 1,914,169 | Rowe | June 13, 1933 |
| 2,047,023 | Geiger et al. | July 7, 1936 |
| 2,091,238 | Gordon | Aug. 24, 1937 |
| 2,116,450 | Richardson et al. | May 3, 1938 |
| 2,201,049 | Moore | May 14, 1940 |
| 2,393,265 | Richardson et al. | Jan. 22, 1946 |

OTHER REFERENCES

Procedures in Exper. Physics, Strong et al. Published by Prentice Hall, Inc., N.Y., 1938, pages 5 to 7.

Handbook of the Glass Industry, Scholes, Published by Ogden Watney Publishers, Inc., N. Y., 1941, page 67.